United States Patent
Sasso et al.

(10) Patent No.: US 9,632,930 B2
(45) Date of Patent: Apr. 25, 2017

(54) SUB-AREA FCID ALLOCATION SCHEME

(75) Inventors: Christian Sasso, Milpitas, CA (US); Siddharth Kasat, Santa Clara, CA (US); Ankur Goyal, Fremont, CA (US); Ronak Desai, Fremont, CA (US); Hariharan Balasubramanian, Oak Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 1065 days.

(21) Appl. No.: 12/716,955

(22) Filed: Mar. 3, 2010

(65) Prior Publication Data

US 2011/0219183 A1 Sep. 8, 2011

(51) Int. Cl.
G06F 15/177 (2006.01)
G06F 12/06 (2006.01)
G06F 15/173 (2006.01)
H04L 12/54 (2013.01)

(52) U.S. Cl.
CPC ............ G06F 12/06 (2013.01); G06F 15/173 (2013.01); H04L 12/56 (2013.01)

(58) Field of Classification Search
CPC ....... H04L 49/357; H04L 12/56; G06F 12/06; G06F 15/173
USPC ......................................................... 709/220
See application file for complete search history.

(56) References Cited

U.S. PATENT DOCUMENTS

| | | | | |
|---|---|---|---|---|
| 5,805,924 A | * | 9/1998 | Stoevhase ........................ 710/11 |
| 6,014,715 A | * | 1/2000 | Stoevhase ........................ 710/11 |
| 6,400,730 B1 | * | 6/2002 | Latif ....................... H04L 12/06 370/466 |
| 7,424,533 B1 | * | 9/2008 | Di Benedetto ..... H04L 67/1097 709/220 |
| 7,512,123 B1 | | 3/2009 | DeSanti et al. |
| 7,711,893 B1 | * | 5/2010 | Venkatachary ............... 711/108 |
| 7,773,629 B1 | * | 8/2010 | Dropps et al. ................ 370/471 |
| 8,351,448 B1 | * | 1/2013 | McGlaughlin ................ 370/419 |
| 8,705,351 B1 | * | 4/2014 | McGlaughlin ...... H04L 67/1097 370/220 |
| 8,706,905 B1 | * | 4/2014 | McGlaughlin ................ 709/238 |
| 8,711,864 B1 | * | 4/2014 | Ko ...................... H04L 12/4633 370/381 |
| 2002/0034178 A1 | * | 3/2002 | Schmidt et al. .............. 370/386 |
| 2004/0141521 A1 | * | 7/2004 | George ......................... 370/463 |
| 2006/0047907 A1 | * | 3/2006 | Shiga et al. .................. 711/114 |
| 2006/0176889 A1 | * | 8/2006 | Berman ....................... 370/405 |
| 2007/0002883 A1 | * | 1/2007 | Edsall et al. .................. 370/422 |
| 2007/0266132 A1 | * | 11/2007 | Hariharan ......... H04L 29/12254 709/223 |

(Continued)

Primary Examiner — Philip Chea
Assistant Examiner — Wing Ma
(74) Attorney, Agent, or Firm — Patterson + Sheridan LLP

(57) ABSTRACT

Certain embodiments of the present disclosure generally relate to allocating a sub-area of Fiber Channel addresses (FCIDs) to a device. A range of addresses may be assigned to the device using a mask address, where the most significant bits represent a mask and the least significant bits represent a sub-range of FCIDs available to be assigned to the device. Therefore, routing information may be stored efficiently in a Ternary Content Addressable Memory (TCAM) by storing a single entry in the TCAM for each sub-area of FCIDs allocated to a device, instead of storing an entry for each FCID. The single entry may indicate the mask address and the width of the mask.

15 Claims, 6 Drawing Sheets

(56) References Cited

U.S. PATENT DOCUMENTS

| | | | |
|---|---|---|---|
| 2007/0297428 A1* | 12/2007 | Bose | H04L 67/1008 370/401 |
| 2008/0095152 A1* | 4/2008 | George et al. | 370/389 |
| 2008/0320143 A1* | 12/2008 | Di Benedetto | G06F 21/6218 709/226 |
| 2009/0019142 A1* | 1/2009 | Dutt | H04L 47/10 709/223 |
| 2009/0037977 A1* | 2/2009 | Gai | H04L 41/00 726/1 |
| 2009/0092141 A1* | 4/2009 | Banerjee | H04L 49/354 370/397 |
| 2009/0141657 A1* | 6/2009 | Dutt et al. | 370/254 |
| 2009/0162058 A1 | 6/2009 | DeSanti et al. | |
| 2009/0252181 A1* | 10/2009 | Desanti | 370/474 |
| 2009/0327518 A1* | 12/2009 | DeSanti et al. | 709/238 |
| 2010/0082895 A1* | 4/2010 | Branscome et al. | 711/108 |

* cited by examiner

TCAM ENTRIES:

| | | | |
|---|---|---|---|
| 602 → | VSAN | DD:AA:00 | fc3/2 | Disc X:flogi
| 604 → | VSAN | DD:AA:01 | fc3/2 | Disc X:fdisc #1
| 606 → | VSAN | DD:AA:02 | fc3/2 | Disc X:fdisc #2
| 608 → | VSAN | DD:AA:03 | fc3/2 | Disc X:fdisc #3

FIG. 6A

PROPOSED TCAM ENTRIES:

| | | | |
|---|---|---|---|
| 610 → | VSAN | DD:AA:00/14 | fc3/2 | Disc X:flogi + 3 fdiscs

RANGE OF 4 FCIDS ONLY 14 BITS USED FOR ALLOCATION OF A SUB-AREA

FIG. 6B

| FCIDs per sub-area | Max flogis per VSAN | Required entries in TCAM |
|---|---|---|
| 16 | 4096 | 4096 |
| 32 | 2048 | 2048 |
| 64 | 1024 | 1024 |

FIG. 7

SUB-AREA FCID ALLOCATION SCHEME

TECHNICAL FIELD

Embodiments described in this disclosure generally relate to Fibre Channel networks. More particularly, the described embodiments relate to methods and apparatus for allocating sub-areas of Fibre Channel addresses (FCIDs) to a device for efficient storage of routing information in a ternary content addressable memory (TCAM).

BACKGROUND

With the increasing popularity of Internet commerce and network centric computing, businesses and other organizations are becoming more and more reliant on information. To handle all of this data, storage area networks or SANs have become very popular. A SAN typically includes a number of storage devices, a plurality of hosts, and a number of switches arranged in a Switching Fabric that connects the storage devices and the hosts.

Fibre Channel frames are used for communication between hosts and storage devices within a Fabric. A Fibre Channel frame header carries the addresses for the source and destination devices (e.g., Fibre Channel addresses or FCIDs). When a host wishes to access a storage device, the FCIDs of the host and the storage device are inserted into the source and destination fields of the header. The switches within the fabric then route the frame to the target storage device using the destination FCID. The target device generates a response frame that includes its own FCID in the source field and the FCID of the host in the destination field. The frame is then routed back across the fabric in a similar way.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 6A-6B illustrate a specific example utilizing the sub-area allocation scheme, in accordance with certain embodiments of the present disclosure.

FIG. 7 illustrates a table showing maximum number of devices allowed to login to a switch and number of required entries in a ternary content addressable memory (TCAM) based on the size of the sub-area FCID allocation, in accordance with certain embodiments of the present disclosure.

DESCRIPTION

Overview

Figure 1:
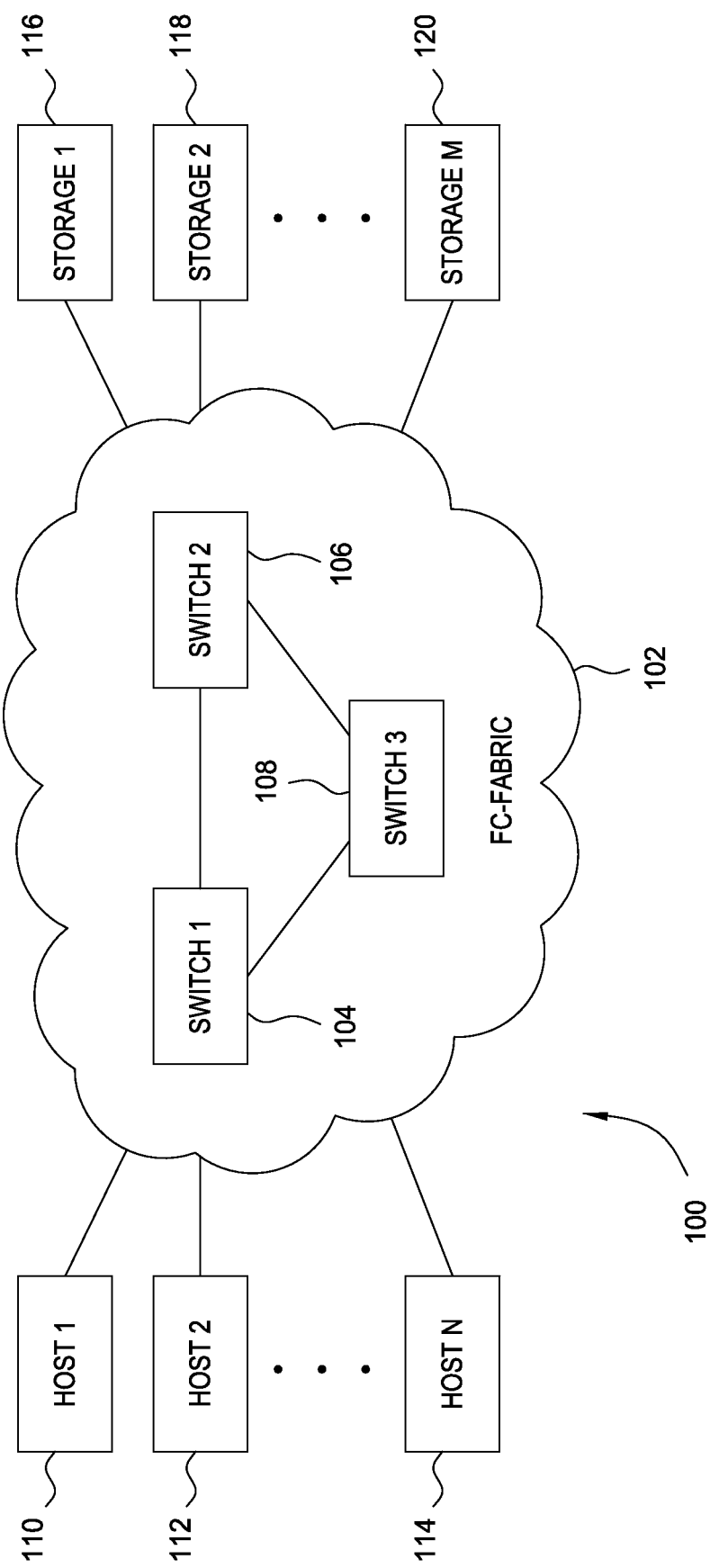
FIG. 1 illustrates a diagram of a Fibre Channel Fabric, in accordance with certain embodiments of the present disclosure.

Certain embodiments of the present disclosure provide techniques for communication in a Fibre Channel Network. The method generally includes receiving a request from a device to login to a switch, allocating a range of Fibre Channel addresses (FCIDs) to the device and generating a single entry in a memory indicating the range.

Certain embodiments of the present disclosure provide a switch for communication in a Fibre Channel Network. The switch generally includes a processor; and a memory containing a program configured to communicate in the network, which, when executed on the processor performs an operation, comprising receiving a request from a device to login to the switch, allocating a range of FCIDs to the device, and generating a single entry in a memory indicating the range.

Certain embodiments of the present disclosure provide a computer-readable storage medium, containing a program, which, when executed on a processor is operable to receive a request from a device to login to a switch, allocate a range of FCIDs to the device, and generate a single entry in a memory indicating the range.

DETAILED DESCRIPTION OF THE PREFERRED EMBODIMENT

Embodiments of the present disclosure generally relate to allocating a range of Fibre Channel addresses (FCIDs) to a device. Doing so allows the routing information to be stored efficiently in a Ternary Content Addressable Memory (TCAM) using a single entry in the TCAM for each sub-area of FCIDs, instead of storing the FCID for each logged in device.

Currently, when a disk storage device attempts to perform a flogi (fabric login) operation followed by multiple fdiscs (fabric discovery) operations, it requires multiple FCIDs, consuming a TCAM entry for each one. Embodiments set forth herein assign all FCIDs required by a disk storage device within a contiguous sub-area field, so an entry in a TCAM can reference the range of FCIDs using only a single entry.

For certain embodiments, in order to conserve TCAM entries, FCIDs that belong to a physical device may be assigned from a contiguous range. These ranges may be called sub-areas and span from a single FCID to 256 FCIDs. For certain embodiments, a size of the sub-areas may be powers of two. For certain embodiments, the sub-area may have any size that is not necessarily a power of two. The advantage of such an FCID allocation scheme is a single TCAM entry may be enough for each device that needs to login to the switch and its associated fabric discovery requests. In addition, if the allocated sub-area overflows, the switch may assign an additional sub-area to the device.

This disclosure references various embodiments. However, it should be understood that this disclosure is not limited to embodiments described herein. Instead, any combination of the following features and elements, whether related to different embodiments or not, is contemplated to implement and practice an embodiment. Furthermore, in various embodiments, embodiments provide numerous advantages over the prior art. However, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s).

Additionally, the application programs disclosed herein may be distributed on a variety of computer-readable storage media. Illustrative computer-readable storage media includes, but is not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored.

Fibre Channel networks utilize an arrangement of switches, called a fabric, to connect devices. This approach simplifies the overhead associated with network traffic, as a device with a Fibre Channel port need only manage a point-to-point connection between its port and the fabric.

FIG. 1 illustrates a diagram of a Fibre Channel fabric 102, in accordance with certain embodiments of the present disclosure. As shown, the fabric 102 includes three switches (104, 106 and 108) and is connected to a plurality of hosts (110, 112 and 114) and a plurality of storage devices (116, 118 and 120). According to certain embodiments, the hosts may be any type of host including but not limited to servers or personal computers. Similarly, the storage devices can be any type of storage devices including but not limited to tape back-up systems, emulated tape back-up systems, CD-ROM storage arrays, or one or more disks such as a Redundant Array of Independent Disks (RAID). The switches can also be any type of Fibre Channel Switch.

Figure 2:
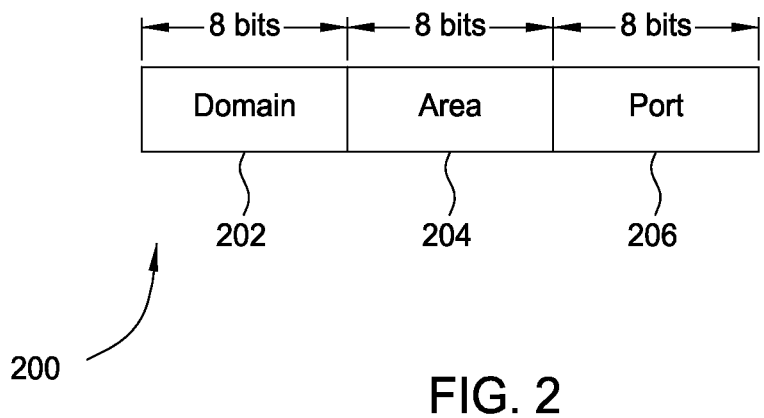
FIG. 2 illustrates an example format for a Fibre Channel address (FCID).

FIG. 2 illustrates an example format for an FCID address, which is subdivided into three fields: domain, area and port fields. The 8-bit domain field 202 is initialized by the local switch with the value of the current domain of the switch. The 8-bit area field 204 and the 8-bit port field 206 provide $2^{16}$=65536 single FCIDs to assign to devices that login to the local switch. The switch manages the allocation of the area and port fields to guarantee the uniqueness of the addresses assigned to each device.

When a device (e.g., a disk) requests to login to a fabric (flogi), it may obtain a single FCID from a local switch. For any subsequent fabric discovery (fdisc) requests performed by the same device, the local switch may again assign a single FCID. And for each FCID assigned to a device, an entry may be reserved in a TCAM to store routing information. Thus, as a single device frequently issues multiple fdisc requests, multiple TCAM entries are required to store the FCID assigned in response to each request, even though traffic corresponding to each entry is ultimately routed to the same port. In one embodiment, by assigning a sub-area for the device, only the address of the sub-area needs to be stored in a TCAM entry on the local switch. Thereafter, as fabric discovery (fdisc) requests are received, FCIDs are assigned using an address within the range of the sub-area, allowing the single TCAM entry to correctly route traffic to the device following the assignment.

Figure 3:
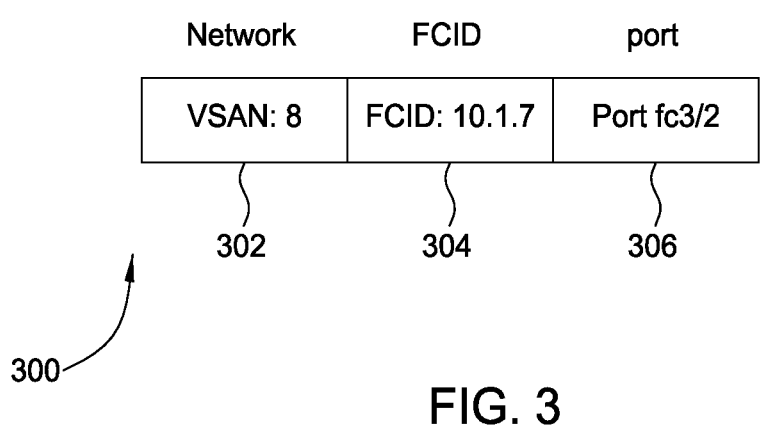
FIG. 3 illustrates an example entry in a ternary content addressable memory (TCAM).

FIG. 3 illustrates an example entry in a TCAM memory. The TCAM entry shows that in a network (e.g., virtual storage area network such as VSAN 8), in order to reach a device having a specific FCID address 304 (e.g., 10.1.7), the traffic may need to be forwarded through a port 306 (e.g., interface fc3/2).

The proposed method may result in savings in the number of required entries in a TCAM. The savings could be seen as either reduction in cost of the required hardware or an increase in the number of devices that may connect to a switch. This may be particularly important for future virtualized networks with many virtualized devices that need to be connected to a switch, hence consuming large number of FCIDs and TCAM entries.

Because the local switch deals with fabric login and fabric discovery requests performed by various devices on a first-come first-served basis, the FCIDs assigned to each device, in general, may not be contiguous over the 16-bit range identified by the area and port fields. This implies that if a device performs an flogi and later ten fdisc requests, eleven entries in the TCAM may need to be reserved in order to store all of the FCIDs.

For certain embodiments, the number of entries that need to be stored in a TCAM may be reduced by allocating a plurality (or sub-area) of FCIDs to a device over a contiguous range and storing a single entry in the TCAM corresponding to the range of FCIDs.

Figure 4:
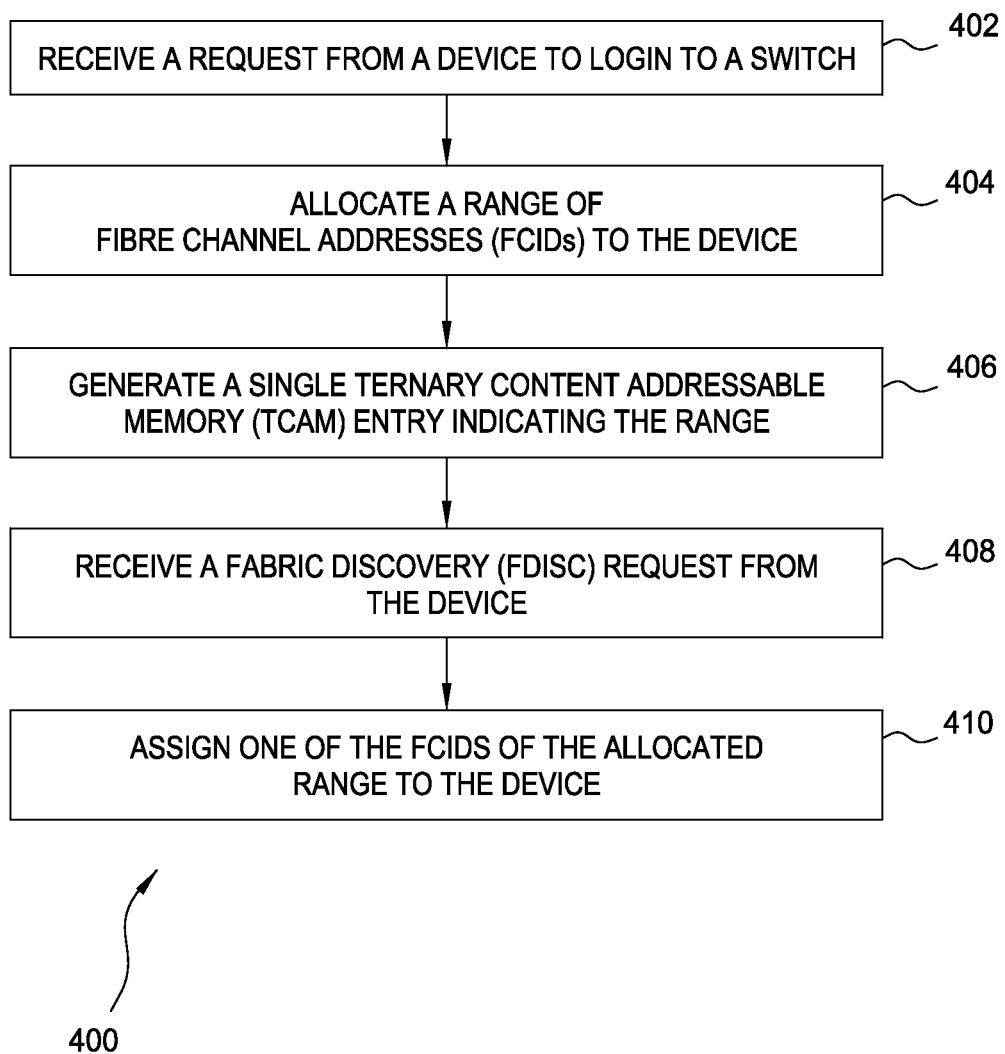
FIG. 4 illustrates example operations for sub-area FCID allocation, in accordance with certain embodiments of the present disclosure.

FIG. 4 illustrates example operations for sub-area FCID allocation, in accordance with certain embodiments of the present disclosure. At 402, a switch receives a request from a device for login. At 404, the switch allocates a range of FCIDs or a sub-area to the device. At 406, the switch generates a single TCAM entry indicating the range. At 408, the switch receives an fdisc request from the device. At 410, the switch assigns one of the FCIDs of the allocated range to the device.

For certain embodiments, if the device has used all of the available FCIDs in the allocated range, an additional range of FCIDs may be allocated to the device.

Therefore, for certain embodiments, by grouping (treating as wildcard or "starring") the least significant bits of the port field in the FCID address, it is possible to compactly store a plurality of FCIDs associated with a device utilizing a single TCAM entry.

Figure 5:
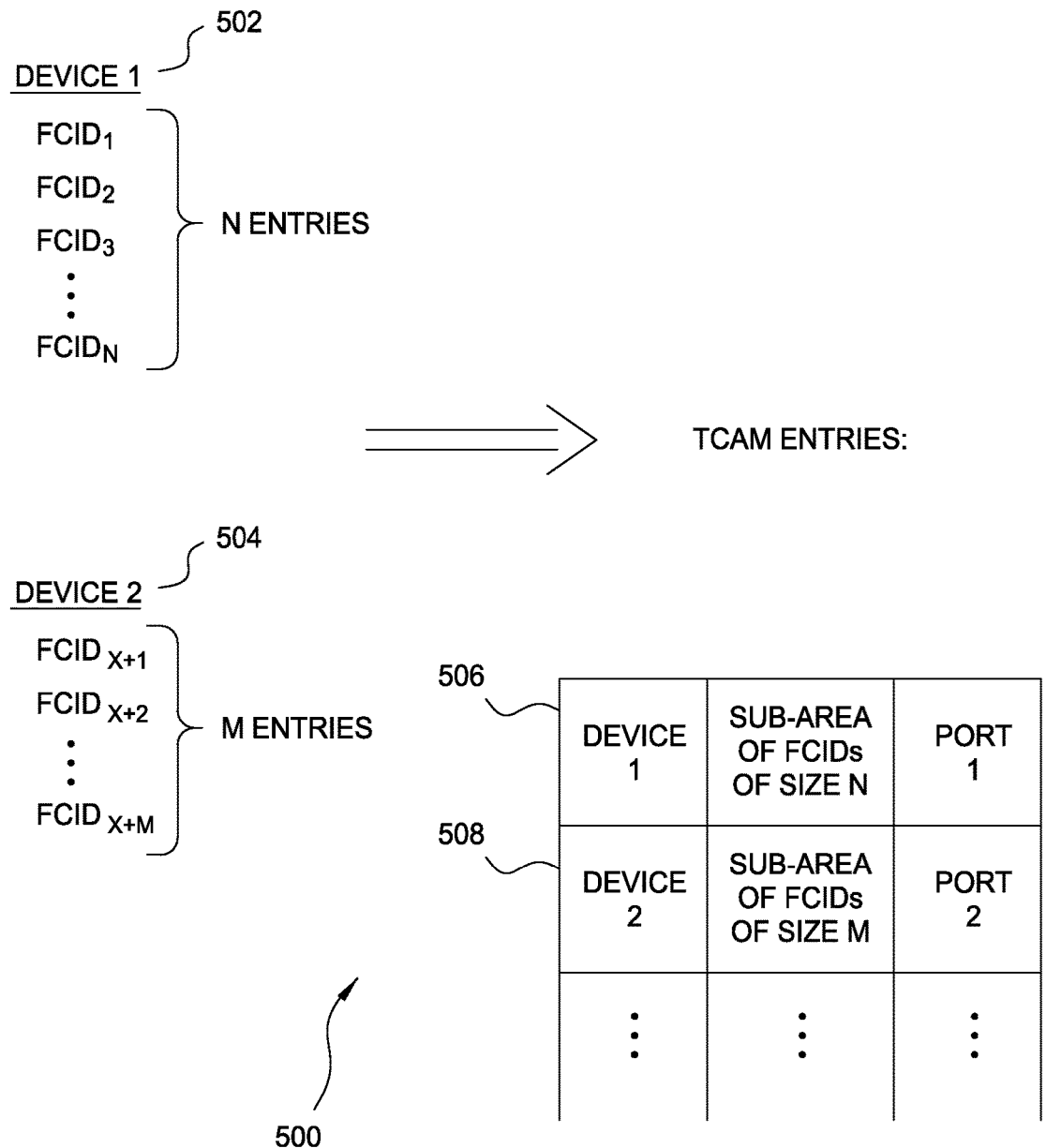
FIG. 5 illustrates an example diagram utilizing the proposed sub-area allocation scheme, in accordance with certain embodiments of the present disclosure.

FIG. 5 illustrates an example of the proposed sub-area allocation scheme, in accordance with certain embodiments of the present disclosure. As illustrated, device1 502 is allocated FCIDs (e.g., $FCID_1, \ldots, FCID_N$) and device2 504 is allocated FCIDs (e.g., $FCID_{X+1}, \ldots, FCID_{X+M}$). According to the proposed sub-area allocation scheme, instead of entries in the TCAM corresponding to device1, only one entry 506 needs to be written in the TCAM that shows a sub-area of FCIDs of size is allocated to device1 which is connected to port1. Similarly, a second entry 508 in the TCAM shows that a sub-area of FCIDs of size is allocated to device2 which is connected to port2.

FIG. 6A-6B illustrate a specific example utilizing the proposed sub-area FCID allocation scheme, in accordance with certain embodiments of the present disclosure. In this example, FIG. 6A shows the result of disk performing an flogi request and three fdisc requests. As a result, four FCID addresses have been allocated to disk X, one for each request. Further, four TCAM entries 602-608 have been programmed into the local switch, one corresponding to each request.

According to the techniques described herein, instead of consuming four TCAM entries (e.g., entries 602-608) for the four allocated FCIDs (as shown in FIG. 6A) a sub-area of addresses may be assigned to the device in response to the flogi request. Doing so allows the FCIDs assigned in response to subsequent fdisc requests to be assigned from the sub-area. Assume a sub-area that supports a range of four FCIDs is to be assigned. FIG. 6B shows this result using a single entry 610 which has a mask address (DD:AA:00) and a width field of "14." The width field indicates how many bits of the address comprise the mask. The remaining bits (in this case 2) indicate how may FCIDs are available for use as part of the sub-range of FCIDs allocated to disk X. In this particular example, the address of DD:AA:00 corresponds to a binary value of 11011101.10101010.00000000. The width value of "14" indicates that any traffic with a destination FCID that matches the first fourteen bits should be routed to the port fc3/2 (i.e., any traffic with a destination address of 11011101.10101010.000000** is routed to this port). That is, any traffic with an FCID destination address matching the mask is routed to the port fc3/2, for any combination of least significant bits of (i.e., one of 00, 01, 10 and 11).

Thus, as described, when disk requests to login to the switch (e.g., using the flogi operation), a plurality of FCIDs are assigned to it over a contiguous range. In this example, four consecutive FCIDs are assigned to disk X, and the mask address can, therefore, be stored efficiently in a TCAM using a single entry. The single TCAM entry represents the range of addresses assigned to the device in response to the flogi request instead of a specific FCID address assigned.

As mentioned before, the area and port fields in an FCID address contain 16 bits. In one embodiment, the consecutive addresses all share the same most significant bits (MSBs) in the area and port fields. In this example, the range of four addresses corresponds to the 14 MSBs of the port and area fields in an FCID address, and the 2 least significant bits (LSBs) of the FCIDs can take any value (i.e., can be either a 0 or 1).

As shown in the entry 610, the size of the mask can be indicated by adding a suffix (e.g., the '/14') after an FCID address. This notational format corresponds to the value of a "mask" in the CIDR (Classless Inter-Domain Routing) allocation scheme used for IP addresses. The number of addresses in the sub-area is equal to $2^{a-m}$, where a represents the total number of bits in the address (e.g., the 16 bits in the area and port fields of an FCID address) and represents the width of the sub-area field. Hence, the number of FCID addresses in the sub-area in FIG. 6B is equal to $2^{16-14}=2^2=4$.

FIG. 7 illustrates a table showing maximum number of devices allowed to login to a switch and number of required entries in a TCAM based on the average size of an FCID sub-area, in accordance with certain embodiments of the present disclosure.

For example, if size of the sub-area is equal to 32 (i.e., a mask of the 11 MSBs, leaving a range of 5 bits for a sub-range of 33 FCIDs), then the maximum number of flogi requests allowed per VSAN equals 2048 (i.e., $2^{11}$) requests. Note, this allows eight times more requests than is possible using the current FCID allocation scheme. Therefore, 2048 entries may be required in the TCAM to store the routing information for the devices, instead of 2048 plus a separate entry for each fabric discovery (fdisc) request made by each of the 2048 devices. Similarly, sub-area sizes of 16 and 64 FCIDs may require 4096 and 1024 TCAM entries, respectively. Therefore, the larger the size of the sub-area, the smaller the number of required TCAM entries and the greater the savings in terms of TCAM entries.

On the other hand, large sub-area sizes may result in larger internal fragmentation than smaller sub-area sizes. Because if a device is assigned blocks of FCIDs, on average, it may use only half of the FCIDs in the last block. Therefore, sub-area of size 32 may be a suitable choice for the FCID allocation scheme. For certain embodiments, it is possible to mix and match sub-areas of different sizes within the same VSAN.

It should be noted that the proposed FCID allocation scheme is backward compatible with the current FCID allocation schemes. Therefore, it can be used in VSANs that already assign single FCIDs or entire areas to devices.

Certain embodiments of the present disclosure proposed a technique to assign FCIDs required by a device within a contiguous sub-area, so that a TCAM may store routing information corresponding to the FCIDs using only a single entry. There are two main advantages in the proposed scheme.

First, for certain embodiments, a switch may be able to serve more devices (e.g., more than 256) per VSAN, since instead of allocating an entire area (e.g., 256 FCIDs) in order to guarantee a device obtains FCIDs that are all contiguous, the switch may allocate a sub-area of contiguous FCIDs (e.g., 32 FCIDs), and later assign an additional sub-area to the same device if the allocated sub-area is not enough. And second, the routing information corresponding to a sub-area of FCIDs may be stored using a single entry in a TCAM.

While the foregoing is directed to embodiments of the present disclosure, other and further embodiments of the disclosure may be devised without departing from the basic scope thereof, and the scope thereof is determined by the claims that follow.

The invention claimed is:

1. A method for communication in a Fibre Channel Network, comprising:
   receiving a Fibre Channel flogin request from a device to login to a switch;
   identifying a first range of unallocated Fibre Channel addresses (FCIDs) available to assign to the device in the Fibre Channel Network;
   allocating, in response to the request, the first range of unallocated FCIDs to the device, wherein the first range of FCIDs share a common number of most significant bits;
   generating a single entry in a memory indicating the first range of FCIDs allocated to the device, wherein the single entry indicates the common number of most significant bits shared by the FCIDs allocated to the device;
   receiving a plurality of Fibre Channel fabric discovery (fdisc) requests from the device;
   in response to each fdisc request, assigning one of the FCIDs of the allocated range to the device;
   determining the number of unallocated FCIDs in the first range available to assign to the device based on the common number of most significant bits and a number of remaining bits in each FCID in the first range of unallocated FCIDs;
   upon determining that the device has used all of the FCIDs in the allocated range, identifying a second range of unallocated FCIDs available to assign to the device;
   allocating the second range of FCIDs to the device; and
   generating a second single entry in the memory indicating the second range of FCIDs.

2. The method of claim 1, wherein the first range of FCIDs comprises 32 FCIDs.

3. The method of claim 1, wherein a size of the first allocated FCID range is different for different devices.

4. The method of claim 1, wherein a size of the first allocated FCID range is different in different allocations for the device.

5. The method of claim 1, wherein the memory is a ternary content addressable memory (TCAM).

6. A switch, comprising:
a processor; and
a memory containing a program configured to communicate in a Fibre Channel Network, which, when executed on the processor performs an operation, comprising:
   receiving a Fibre Channel flogin request from a device to login to the switch,
   identifying a first range of unallocated Fibre Channel addresses (FCIDs) available to assign to the device in the Fibre Channel Network,
   allocating, in response to the request, the first range of unallocated FCIDs to the device, wherein the first range of FCIDs share a common number of most significant bits,
   generating a single entry in a another memory indicating the first range of FCIDs allocated to the device, wherein the single entry indicates the common number of most significant bits shared by the FCIDs,
   receiving a plurality of Fibre Channel fabric discovery (fdisc) requests from the device,
   in response to each fdisc request, assigning one of the FCIDs of the allocated range to the device;
   determining the number of unallocated FCIDs in the first range available to assign to the device based on the common number of most significant bits and a number of remaining bits in each FCID in the first range of unallocated FCIDs;
   upon determining that the device has used all of the FCIDs in the allocated range, identifying a second range of unallocated FCIDs available to assign to the device;
   allocating the second range of FCIDs to the device; and
   generating a second single entry in the memory indicating the second range of FCIDs.

7. The switching device of claim 6, wherein the first range of FCIDs comprises 32 FCIDs.

8. The switching device of claim 6, wherein a size of the first allocated FCID range is different for different devices.

9. The switching device of claim 6, wherein a size of the first allocated FCID range is different in different allocations for the device.

10. The switching device of claim 6, wherein the other memory is a ternary content addressable memory (TCAM).

11. A non-transitory computer-readable storage medium, containing a program, which, when executed on a processor is operable to:
   receive a Fibre Channel flogin request from a device to login to a switch;
   identify a first range of unallocated Fibre Channel addresses (FCIDs) available to assign to the device in the Fibre Channel Network;
   allocate, in response to the request, the first range of unallocated FCIDs to the device, wherein the first range of FCIDs share a common number of most significant bits;
   generate a single entry in a memory indicating the first range of FCIDs allocated to the device, wherein the single entry indicates the common number of most significant bits shared by the FCIDs allocated to the device;
   receive a plurality of Fibre Channel fabric discovery (fdisc) requests from the device;
   in response to each fdisc request, assigning one of the FCIDs of the allocated range to the device;
   determine the number of unallocated FCIDs in the first range available to assign to the device based on the common number of most significant bits and a number of remaining bits in each FCID in the first range of unallocated FCIDs;
   upon determining that the device has used all of the FCIDs in the allocated range, identify a second range of unallocated FCIDs available to assign to the device;
   allocate the second range of FCIDs to the device; and
   generate a second single entry in the memory indicating the second range of FCIDs.

12. The computer-readable storage medium of claim 11, wherein the first range of FCIDs comprises 32 FCIDs.

13. The computer-readable storage medium of claim 11, wherein a size of the first allocated FCID range is different for different devices.

14. The computer-readable storage medium of claim 11, wherein a size of the first allocated FCID range is different in different allocations for the device.

15. The method of claim 1, wherein the first range of FCIDs comprises a contiguous range of consecutive FCIDs.

* * * * *

UNITED STATES PATENT AND TRADEMARK OFFICE
CERTIFICATE OF CORRECTION

PATENT NO. : 9,632,930 B2  Page 1 of 1
APPLICATION NO. : 12/716955
DATED : April 25, 2017
INVENTOR(S) : Christian Sasso et al.

It is certified that error appears in the above-identified patent and that said Letters Patent is hereby corrected as shown below:

In the Specification

In Column 1, Line 62, delete "FIG." and insert -- FIGS. --, therefor.

In Column 4, Line 42, after "allocated" insert -- N --.

In Column 4, Line 43, after "allocated" insert -- M --.

In Column 4, Line 44, after "of" insert -- N --.

In Column 4, Line 47, after "size" insert -- N --.

In Column 4, Line 49, after "size" insert -- M --.

In Column 4, Line 51, delete "FIG." and insert -- FIGS. --, therefor.

In Column 4, Line 54, after "disk" insert -- X --.

In Column 5, Line 15, after "disk" insert -- X --.

In Column 5, Line 38, after "and" insert -- m --.

In Column 5, Line 62, after "assigned" insert -- K --.

In Column 5, Line 62, before "FCIDs," insert -- N --.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*